(12) United States Patent
Won et al.

(10) Patent No.: US 9,339,759 B2
(45) Date of Patent: May 17, 2016

(54) GAS SEPARATION SYSTEM

(71) Applicant: GS Engineering & Construction Corp., Seoul (KR)

(72) Inventors: Wangyun Won, Seoul (KR); Daeho Ko, Seoul (KR); Kyungtae Park, Seoul (KR)

(73) Assignee: GS ENGINEERING & CONSTRUCTION CORP., Seoul (KR)

( * ) Notice: Subject to any disclaimer, the term of this patent is extended or adjusted under 35 U.S.C. 154(b) by 0 days.

(21) Appl. No.: 14/624,607

(22) Filed: Feb. 18, 2015

(65) Prior Publication Data

US 2015/0273391 A1  Oct. 1, 2015

(30) Foreign Application Priority Data

Apr. 1, 2014  (KR) .................. 10-2014-0038780

(51) Int. Cl.
*B01D 53/047*  (2006.01)
*B01D 53/22*  (2006.01)
(Continued)

(52) U.S. Cl.
CPC ............ *B01D 53/229* (2013.01); *B01D 53/047* (2013.01); *B01D 53/0454* (2013.01); *C10L 3/101* (2013.01); *B01D 2256/245* (2013.01); *B01D 2257/504* (2013.01); *B01D 2259/404* (2013.01); *B01D 2259/40009* (2013.01)

(58) Field of Classification Search
CPC ............. B01D 53/0454; B01D 53/047; B01D 53/229; B01D 2256/245; B01D 2257/504; B01D 2259/40009; B01D 2259/404; C10L 3/101; C10L 3/104

USPC ........ 96/4, 7, 9, 109, 111, 115, 116, 121, 134
See application file for complete search history.

(56) References Cited

U.S. PATENT DOCUMENTS 4,690,695 A  9/1987  Doshi
4,701,187 A  10/1987  Choe et al.
(Continued)

FOREIGN PATENT DOCUMENTS

JP  S62-282616  12/1987
JP  2012-529367  11/2012
(Continued)

OTHER PUBLICATIONS

The Japanese Office Action dated May 26, 2015 issued in corresponding Japanese Patent Application No. 2015-031630.
(Continued)

*Primary Examiner* — Frank Lawrence
(74) *Attorney, Agent, or Firm* — Saliwanchik, Lloyd & Eisenschenk

(57) ABSTRACT

A gas separation system, comprising a buffer tank that stores therein a source gas and supplies the source gas; a pressurizing unit configured to receive the source gas from the buffer tank and pressurize the received source gas; a first refining unit configured to produce a first refined gas by refining the source gas pressurized by the pressurizing unit, and discharge a first waste gas; a second refining unit configured to produce a second refined gas by refining the first refined gas, and discharge a second waste gas; a third refining unit configured to produce a third refined gas by refining the first waste gas; a first collection line configured to guide the second waste gas to the buffer tank, and including a second flow rate control valve for controlling a flow rate of the second waste gas.

10 Claims, 6 Drawing Sheets

(51) Int. Cl.
   *B01D 53/04*   (2006.01)
   *C10L 3/10*    (2006.01)

(56) References Cited

U.S. PATENT DOCUMENTS

| | | | |
|---|---|---|---|
| 5,753,011 A | 5/1998 | Sircar et al. | |
| 8,211,211 B1* | 7/2012 | Knaebel | B01D 53/75 95/119 |
| 2002/0062734 A1* | 5/2002 | Pittroff | B01D 53/22 95/47 |
| 2004/0045432 A1* | 3/2004 | Yamamoto | B01D 53/22 95/48 |
| 2009/0320679 A1* | 12/2009 | Baksh | B01D 53/0462 95/100 |
| 2013/0098242 A1 | 4/2013 | Ungerank et al. | |

FOREIGN PATENT DOCUMENTS

| | | |
|---|---|---|
| JP | 2012-245422 | 12/2012 |
| JP | 2013-534863 | 9/2013 |
| KR | 10-1341068 | 12/2013 |

OTHER PUBLICATIONS

The extended European Search Report dated Jul. 17, 2015 issued in corresponding European Patent Application No. 15156171.9.

* cited by examiner

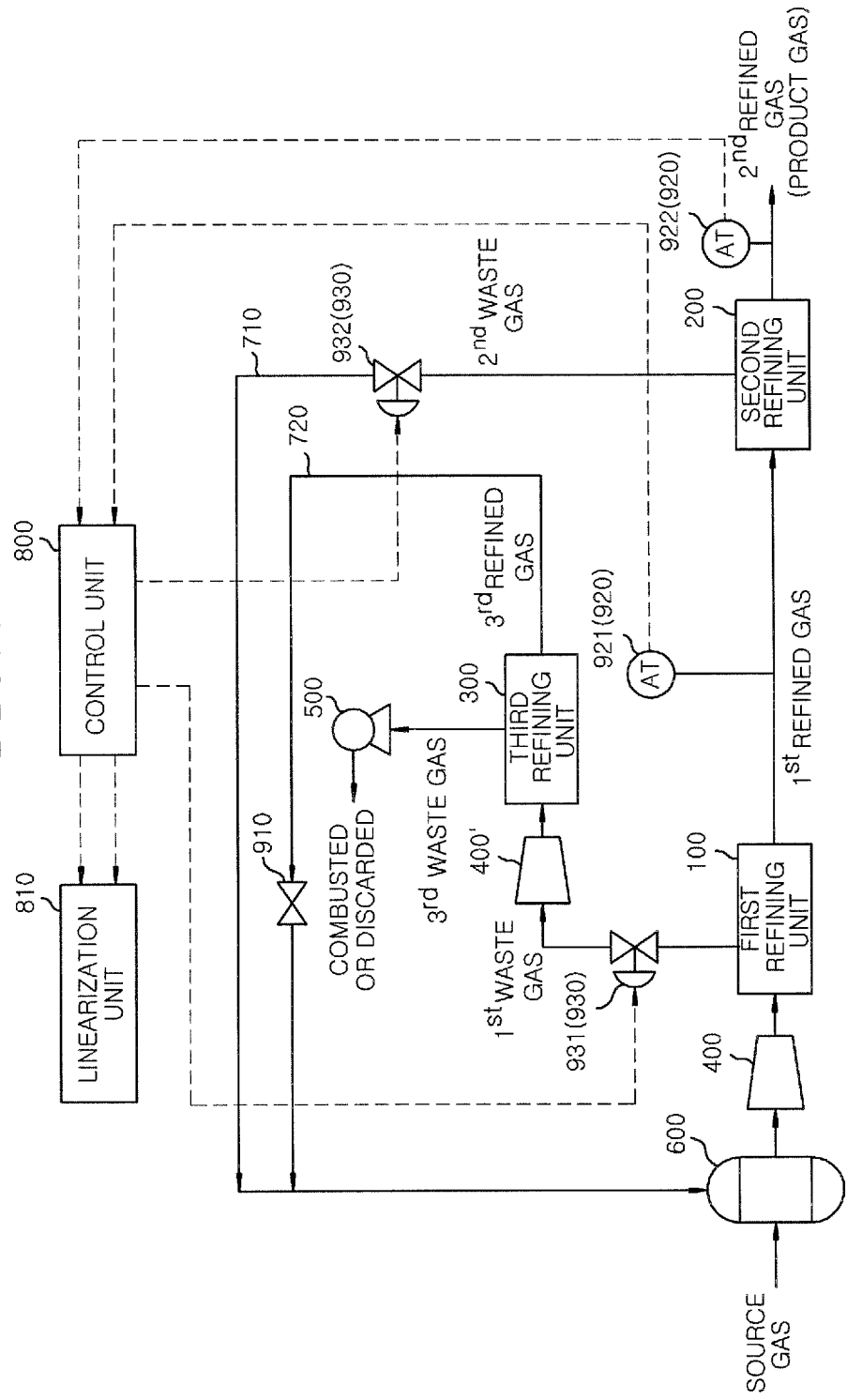

GAS SEPARATION SYSTEM

CROSS-REFERENCE TO RELATED APPLICATIONS

This application is based on and claims priority from Korean Patent Application No. 10-2014-0038780, filed on Apr. 1, 2014, the disclosure of which is incorporated herein in its entirety by reference.

TECHNICAL FIELD

The present disclosure relates to a gas separation system; and, more particularly, to a gas separation system capable of producing methane having high purity and high recovery rate.

BACKGROUND

In general, natural gas (NG) is a fossil fuel which consists primarily of methane and is buried underground in a gaseous state. Unlike other energy sources such as petroleum (gasoline, diesel) that are subjected to artificial processing, the natural gas is gas energy that can be used immediately after directly collected from a gas well.

These days, with the rise of oil price, gas resources such as coalbed methane and shale gas are attracting attention. Especially, the coalbed methane extracted from coalbed is highly favored as a new-generation energy resource in many countries.

As a technique to upgrade the quality of this natural gas, there are known an absorption method of separating methane and carbon dioxide by using a difference in their solubility, a PSA (Pressure Swing Adsorption) method of separating gas-phase substances by using a difference in their adsorption characteristics, a membrane separation method using a difference in permeability of gas molecules, and so forth.

The absorption method accompanies large energy consumption and involves high cost for maintenance such as replenishment of an absorbent or the like, whereas this method features high separation/refinement efficiency and thus can be mainly used for the processing of a large quantity of gas. The PSA method lies between the absorption method and the membrane separation method in the aspect of separation/refinement efficiency, scale and complexity of the process. The membrane separation method is conducted on a relatively smaller scale than the absorption method or the PSA method, and it is difficult to achieve high-purity methane with this method. Nevertheless, the membrane separation method has an advantage in that the process is simple.

Meanwhile, since the composition of a gas drilled and produced from a gas well could be changed with the lapse of time, a process of separating and refining the produced gas is required to be designed as being capable of eliminating and separating impurities stably while overcoming the change in the composition of the gas.

To this end, there has been a demand for a system capable of obtaining a product gas having high purity and high recovery rate by eliminating and separating impurities continually and stably even if the composition of the natural gas produced from the gas well changes.

Patent Document 1: Korean Patent No. KR 10-0753207 (Registered on Aug. 28, 2007)

SUMMARY

In view of the foregoing problems, exemplary embodiments of the present disclosure provide a gas separation system capable of producing a high-purity methane gas stably by monitoring the gas composition in real time Further, the exemplary embodiments also provide a gas separation system capable of producing a methane gas that satisfies the requirements for high purity and high recovery rate at the same time.

Furthermore, the exemplary embodiments also provide a gas separation system capable of producing a methane gas having high purity even in case that the content of methane in a source gas is low.

In addition, the exemplary embodiments further provide a gas separation system capable of reducing energy consumption.

However, the problems sought to be solved by the present disclosure are not limited to the above description and other problems can be clearly understood by those skilled in the art from the following description.

According to the exemplary embodiments, it is possible to produce a high-purity methane gas stably by monitoring the gas composition in real time.

Further, it is also possible to provide a gas separation system capable of producing a methane gas having high purity and high recovery rate.

Especially, it is possible to provide a gas separation system capable of producing a high-purity methane gas even in case that the content of methane in a source gas is low.

In addition, it is possible to provide a gas separation system capable of reducing energy consumption.

BRIEF DESCRIPTION OF THE DRAWINGS

FIG. 6 is a block diagram illustrating a gas separation system in accordance with another modification example of the second exemplary embodiment.

DETAILED DESCRIPTION

Hereinafter, configurations and operational principles of the present disclosure will be elaborated with reference to the accompanying drawings, which form a part hereof. In discussing the present disclosure, detailed description of known functions or configurations will be omitted when the description disturbs clear understanding of the essentials of the present disclosure. Further, the various terms used below are defined in consideration of functions in the present disclosure, and different terms may be used depending on intentions of users and operators or practices in the relevant art. Thus, definition of the various terms used in the present application should be formulated based on the whole disclosure of the present application.

A gas separation system in accordance with the following exemplary embodiments may be applicable to various relevant apparatuses or equipment designed to utilize a methane-containing source gas as energy source by refining it. Here, it is to be noted that the embodiments of the invention are not limited to the following description. For the convenience of explanation, in the following exemplary embodiments, refined methane is described to be produced by refining a source gas such as a coalbed methane, a natural methane gas or a shale gas.

This gas separation system is configured to separate a gas into a refined gas and a waste gas through a refining unit. Here, the refined gas may be defined as, among two gas flows exhausted through the refining unit, a gas containing methane having relatively high purity, whereas the waste gas may be defined as a gas containing methane having relatively low purity.

Figure 1:
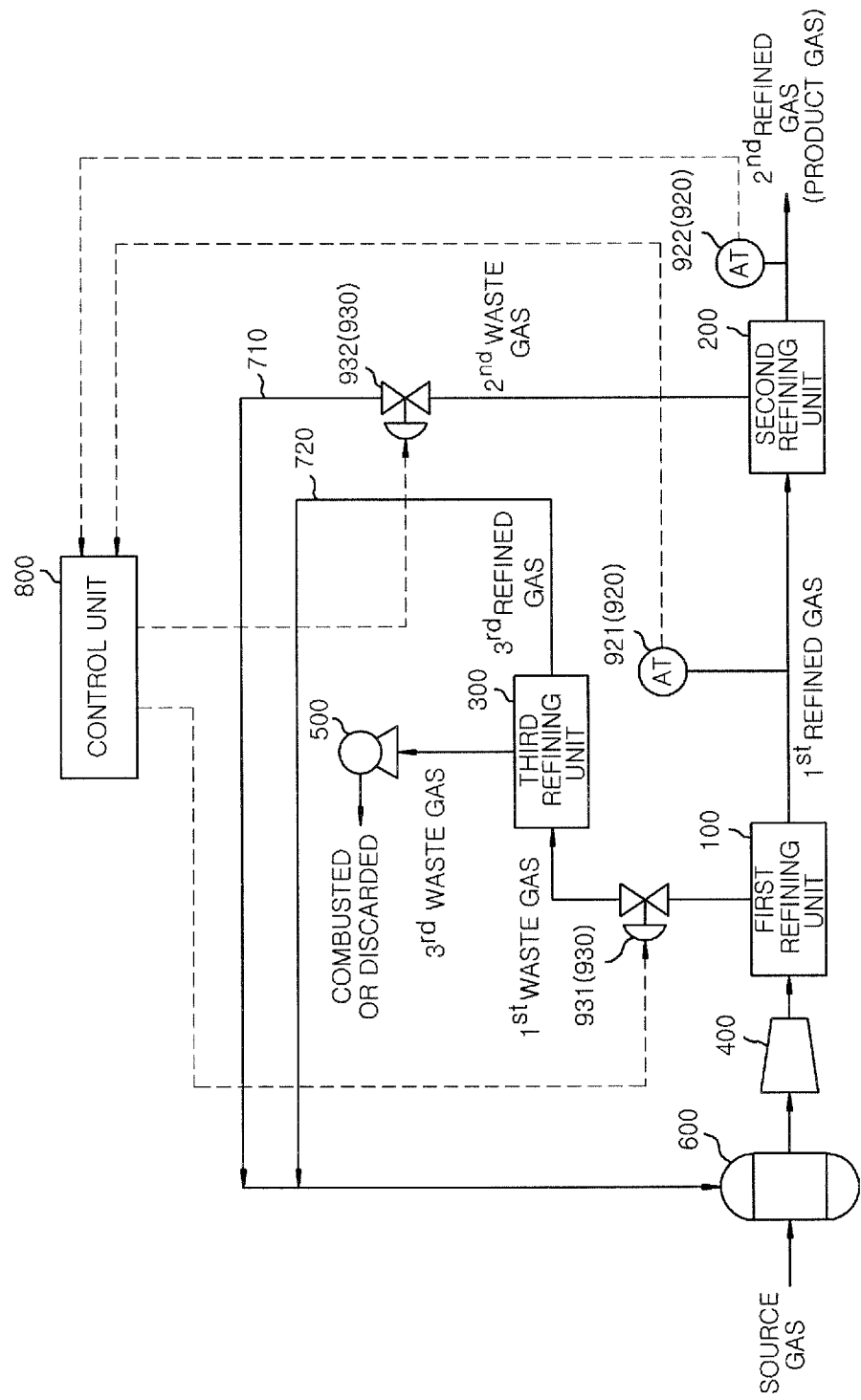
FIG. 1 is a block diagram illustrating a gas separation system in accordance with a first exemplary embodiment of the present disclosure.
Figure 2:
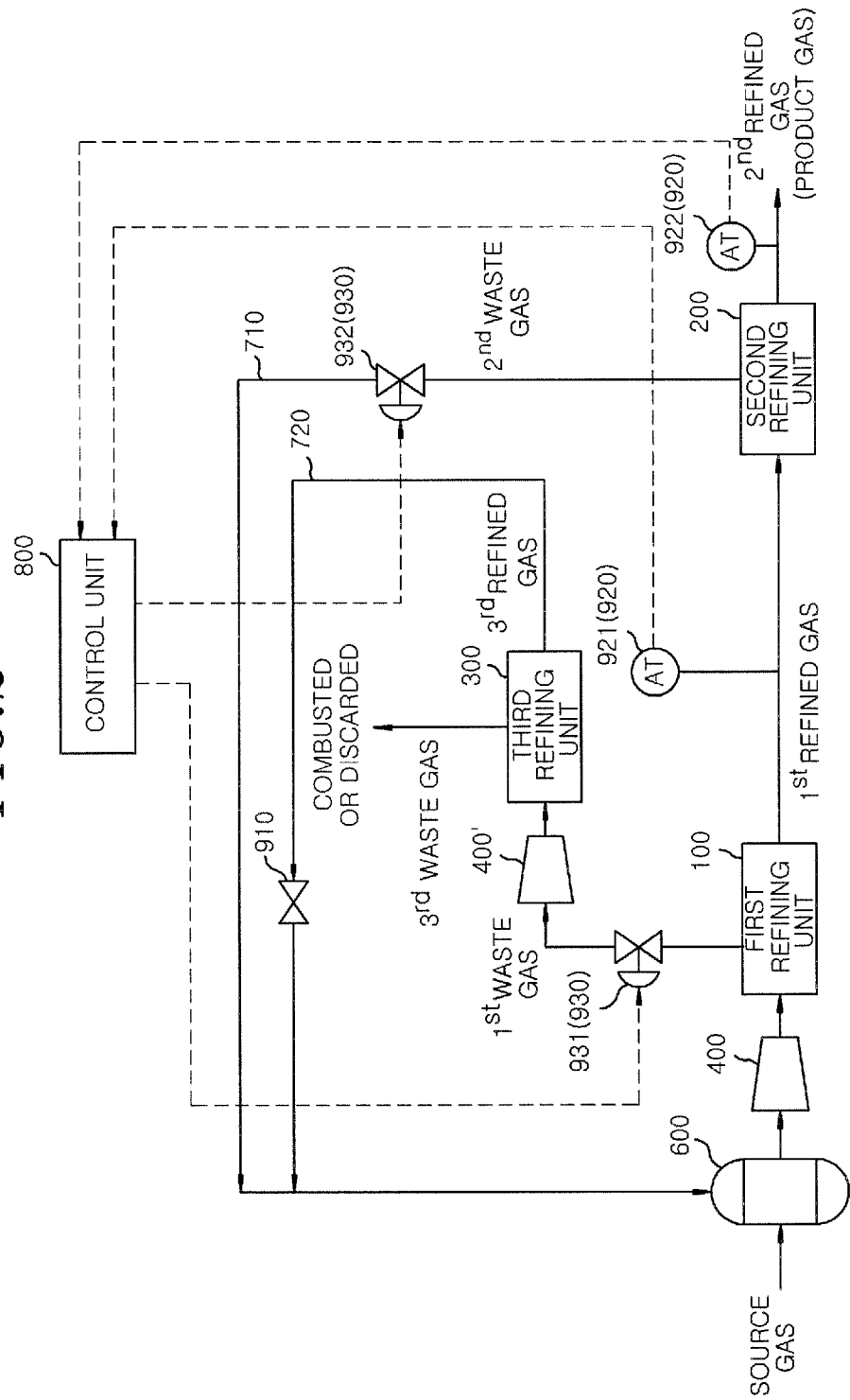
FIG. 2 is a block diagram illustrating a gas separation system in accordance with a modification example of the first exemplary embodiment.
Figure 3:
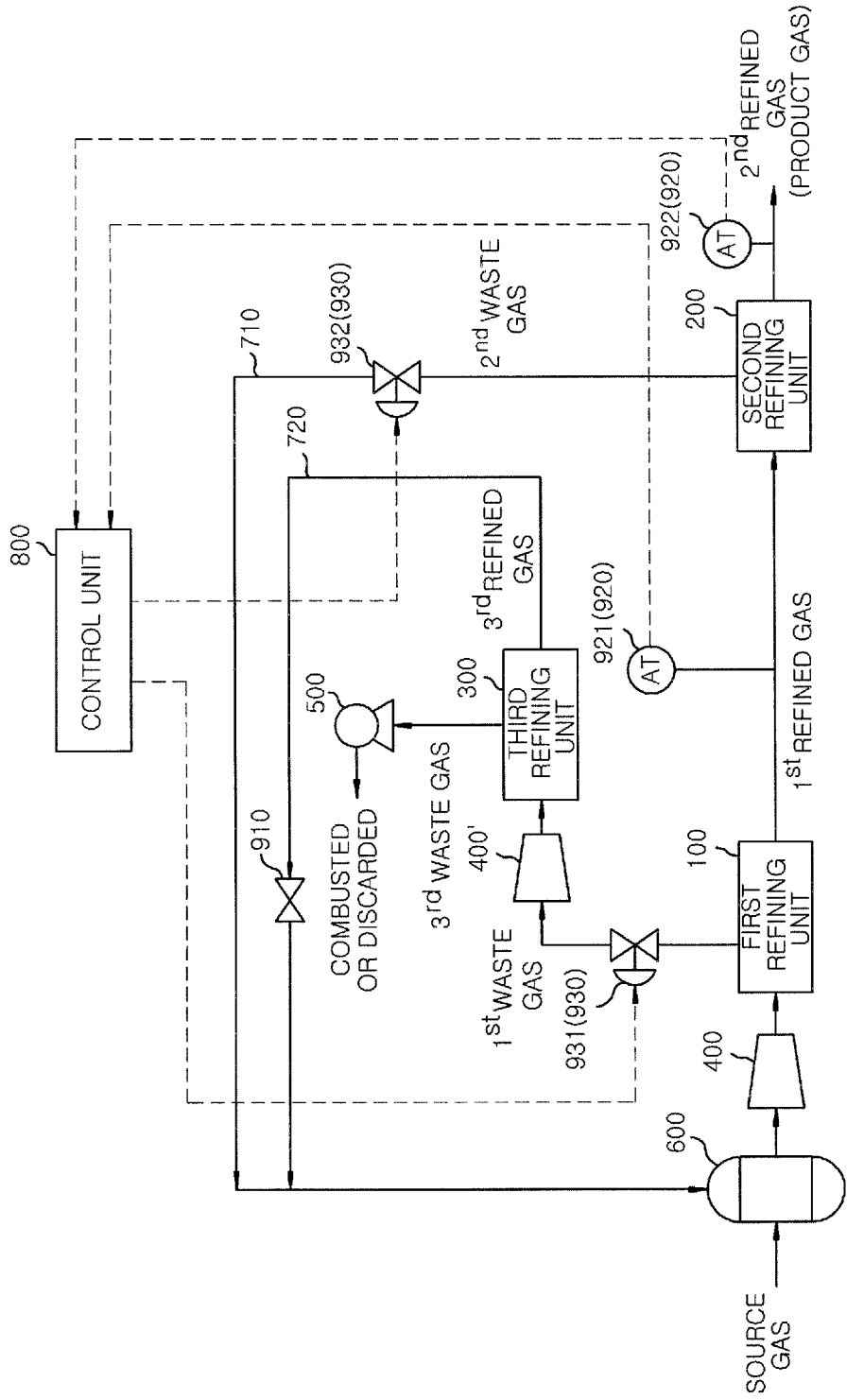
FIG. 3 is a block diagram illustrating a gas separation system in accordance with another modification example of the first exemplary embodiment.

FIG. 1 is a block diagram illustrating a gas separation system in accordance with the first exemplary embodiment of the present disclosure. FIG. 2 is a block diagram illustrating a gas separation system in accordance with a modification example of the first exemplary embodiment. FIG. 3 is a block diagram illustrating a gas separation system in accordance with another modification example of the first exemplary embodiment.

As depicted in FIG. 1, the gas separation system in accordance with the first exemplary embodiment includes a buffer tank 600, a pressurizing unit 400, a first refining unit 100, a second refining unit 200, a third refining unit 300, a vacuum pump 500, a first collection line 710, a second collection line 720, a detection sensor 920, a flow rate control valve 930 and a control unit 800.

Here, each of the first to third refining units 100 to 300 is configured to refine methane through either one of a membrane separation method and a PSA (Pressure Swing Adsorption) method. By way of example, in the present exemplary embodiment, membrane separation type refining apparatuses are used in the first refining unit 100 and the third refining unit 300, whereas a PSA type refining apparatus is used in the second refining unit 200. However, it should be noted that the present exemplary embodiment is not limited thereto. By way of example, the first refining unit 100 may use the membrane separation method, and the second and third refining units 200 and 300 may use the PSA method. Alternatively, the first and second refining units 100 and 300 may use the membrane separation method, and the third refining unit may use the PSA method. Further, the first to third refining units 100 to 300 are configured to exhaust an inlet gas by separating it into the waste gas and the refined gas. At this time, a high-quality refined gas can be obtained only if a pressure ratio between the inlet gas and the waste gas is maintained at an appropriate level.

The buffer tank 600 temporarily stores therein a gas that contains the methane gas at a certain ratio. For example, the source gas supplied to the buffer tank 600 may consist of about 60% of the methane gas and about 40% of the carbon dioxide gas. The buffer tank 600 also temporarily stores therein the second waste gas of the second reining unit 200 and the third refined gas of the third refining unit 300 to be described later. The source gas, the second waste gas and the third refined gas stored in the buffer tank 600 can be pressurized by the pressurizing unit 400.

In the following, for the convenience of explanation, a mixture of the source gas, the second waste gas and the third refined gas will be referred to as a "mixture gas." Here, the mixture gas may be composed of only the source gas when the gas separation system is initially driven, and the composition of the mixture gas may be changed depending on the supply of the second waste gas and the third refined gas into the buffer tank 600. As one example, in case that the source gas having the aforementioned composition is supplied and the second waste gas and the third refined gas are supplied into the buffer tank 600, the mixture gas may consist of about 65% of the methane gas and about 35% of the carbon dioxide gas.

The pressurizing unit 400 is configured to pressurize the mixture gas to a set pressure to allow the mixture gas to be refined well in the first refining unit 100. A pressure ratio between the mixture gas compressed by the pressurizing unit 400 and the first waste gas of the first refining unit 100 should be maintained at an appropriate level to separate gas successfully by using the membrane separation method. For example, the pressurizing unit 400 may pressurize the mixture gas to about 10 bar, and the first refining unit 100 may receive the mixture gas of about 10 bar and then exhaust the first waste gas of about 1 bar.

In the present exemplary embodiment, the pressure of the mixture gas supplied into the first refining unit 100 is maintained at about 10 bar, and the pressure of the first waste gas is maintained at about 1 bar. However, the exemplary embodiment is not limited to this example, and the set pressure of the pressurizing unit 400 and the pressure difference between the mixture gas and the first waste gas may be varied depending on the composition or amount of the gases, required levels of purity and recover rate, and so forth.

The first refining unit 100 may be configured to refine the mixture gas through the membrane separation method. To elaborate, the first refining unit 100 may include a membrane that separates the mixture gas into the first refined gas and the first waste gas by using a difference in permeability of gas components. Here, the first waste gas is a gas that permeates the membrane, and the first refined gas is a gas that is just discharged out without permeating the membrane. Through this mechanism, the first refined gas can contain a higher ratio of the methane gas than the first waste gas. By way of example, when the mixture gas having the aforementioned composition is supplied, the first refined gas may consist of about 93% of the methane gas and about 7% of the carbon dioxide gas, whereas the first waste gas may consist of about 38% of the methane gas and about 62% of the carbon dioxide gas.

Here, the first waste gas that has permeated the membrane of the first refining unit 100 may have a pressure of about 1 bar, and the first refined gas can be sent to the second refining unit 200 while hardly experiencing a pressure loss.

The second reining unit 200 is configured to refine the first refined gas through the PSA method, and exhaust the second refined gas and the second waste gas. To elaborate, the second refining unit 200 may include a multiple number of (e.g., four) beds that are operated to repeat an adsorption stage and a reproduction stage. The beds are synchronized with each other such that the refined gas is continually discharged from the second refining unit 200. To be more specific, the adsorption stage may include a pressurization step and an adsorption step, and the reproduction stage may include a blow-down step and a purge step.

The second waste gas discharged from the second refining unit 200 is a gas in which impurity is concentrated more than that in the first refined gas. The second waste gas is moved into the buffer tank 600 through the first collection line 710. Meanwhile, the second refined gas obtained in the second refining unit 200 is almost free of impurity and can be supplied as a product gas to a certain place where it is supposed to be consumed. As one example, when the first refined gas having the aforementioned composition is supplied to the second refining gas 200, the second refined gas may consist of about 97% of the methane gas and about 3% of the carbon dioxide gas, whereas the second waste gas may consist of about 77% of methane gas and about 23% of carbon dioxide gas.

The first collection line 710 connects the second refining unit 200 and the buffer tank 600 and guides the second waste gas discharged from the second refining unit 200 to the buffer tank 600.

As stated above, the first collecting line 710 delivers the second waste gas back into the buffer tank 600 to allow the second waste gas to be re-circulated through the first refining unit 100 and the second refining unit 200. Accordingly, methane can be collected from the second waste gas that is discarded, so that recovery rate of methane can be improved.

Meanwhile, the third refining unit 300 is configured to receive the first waste gas from the first refining unit 100 and refine the received first waste gas by using the membrane separation method, like the first refining unit 100. To elaborate, the third refining unit 300 may include a membrane that separates the first waste gas into the third refined gas and the third waste gas, and the specific operation of the third refining unit 300 is the same as that of the first refining unit 100.

In the third refining unit, however, the first waste gas can be effectively refined only when a pressure ratio between the introduced first waste gas and the discharged third wasted gas is maintained at an appropriate level. Thus, a low pressure (e.g., about 0.1 bar) of almost a vacuum pressure level may be created on the side of the third waste gas by the vacuum pump 500.

The third refined gas obtained in the third refining unit 300 is guided back into the buffer tank 600 through the second collection line 720 and then transferred into the first refining unit 100 again. Meanwhile, the third waste gas may be combusted or discarded. Here, if the first waste gas as in the aforementioned example is supplied into the third refining unit 300, the third refined gas may consist of about 77% of the methane gas and about 23% of the carbon dioxide gas, whereas the third waste gas may consist of about 13% of the methane gas and about 87% of the carbon dioxide gas.

The second collection line 720 connects the third refining unit 300 and the buffer tank 600, and guides the third refined gas of the third refining unit 300 to the buffer tank 600. That is, the second collection line 720 delivers the third refined gas into the buffer tank 600, thus allowing the third refined gas to be re-circulated through the first refining unit 100 and the second refining unit 200. Thus, high-purity methane gas can be produced, and recovery rate of the methane gas can be improved.

Meanwhile, in a refining unit, e.g., the second refining unit 200 that adopts the PSA method, a high-pressure second waste gas may be generated momentarily through the blow-down step and the purge step. If this high-pressure second waste gas generated in the second refining unit 200 is introduced into the buffer tank 600, a temporary pressure rise may occur within the buffer tank 600. As a result, the pressures of the third refined gas and the first waste gas would be momentarily increased, causing the pressure ratio between the inlet gas and the discharged waste gas in the first refining unit 100 using the membrane separation method not to be maintained at the appropriate level. Resultantly, refining performance of the first refining unit 100 would be degraded, and the content of the impurities included in the discharged refined gas would be increased.

In the present exemplary embodiment, the buffer tank 600 may be fabricated to have large size to solve the aforementioned problems. However, fabricating the buffer tank 600 to have a sufficiently large size is not a realistic solution in a construction site where there is restrictions in footprint and cost of the buffer tank.

Accordingly, in the present exemplary embodiment, to solve the aforementioned problems, the pressure of the buffer tank 600 is controlled and the pressure ratio between the inlet gas and the waste gas in each of the refining units 100 to 300 is maintained at an appropriate level through the control of the flow rate control valve 930 by the control unit 800. As a consequence, purity of the product gas can be maintained at a desired level.

Meanwhile, the detection sensor 920 includes a first detection sensor 921 provided on a first refined gas discharge line of the first refining unit 100; and a second detection sensor 922 provided on a second refined gas discharge line of the second refining unit 200. Each detection sensors 921 and 922 is configured to measure the composition of the refined gas, or to measure a temperature, a pressure, a flow rate of a refined gas, and so forth. The detection sensor 920 of the present exemplary embodiment may be implemented by a content analyzer configured to measure the composition of the refined gas.

The flow rate control valve 930 includes a first flow rate control valve 931 provided on a first waste gas discharge line of the first refining unit 100; and a second flow rate control valve 932 provided on a second waste gas discharge line of the second refining unit 200, e.g., on the first collection line 710. Opening amount of these flow rate control valves 931 and 932 are controlled by the control unit 800, whereby flow rates of the gases transferred to the buffer tank 600 can be adjusted.

The control unit 800 is configured to control the first flow rate control valve 931 and the second flow rate control valve 932 in an overall manner such that the first refined gas and the second refined gas maintain purity over a certain level. For this purpose, the control unit 800 receives detection values from the detection sensor 920 in real time or at a short time interval, and calculates and controls the opening amounts of the flow rate control valve based on the detection values. As one example, the control unit 800 may use model-based high-level control mechanism (e.g., model predictive control or repetitive control, etc.).

By utilizing the detection values received from the detection sensor 920 in real time in conducting the control operation, the control unit 800 is capable of allowing high-purity product gas to be supplied stably and continually. Further, since a pressure rise of the waste gas discharged from the second refining unit 200 can be prevented even in the buffer tank 600 having a relatively small size, economical efficiency in the installation and operation of the entire system can be improved.

For example, assuming that the membrane separation method is applied to the first refining unit 100, the control unit 800 may determine that the pressure of the buffer tank 600 has risen when the methane gas content in the first refined gas decreases. In such a case, the control unit 800 may reduce the flow rate of the gases supplied to the buffer tank 600 by adjusting the flow rate control valves 931 and 932.

Further, the control unit 800 controls an operation time of each processing step of the refining unit which adopts the PSA method, e.g., the second refining unit 200. The multiple adsorption beds included in the second refining unit 200 are subjected to the pressurization step, the adsorption step, the blow-down step and the purge step repeatedly at a regular time interval. The control unit 800 is configured to control the discharge pressure or the discharge flow rate of the second waste gas by adjusting the operation time of each of these processing steps.

Meanwhile, if the adjustment of the operation time of each processing step of the PSA type refining unit is applied in common to the multiple number of beds which are operated to perform different processing steps in the same period, adjustment of a processing time of a single bed may affect a processing time of the other beds. Accordingly, the composition of the refined gas from the refining unit in which the respective beds are operated to discharge the refined gas by turns may be changed. By way of example, assume that four beds are operated in the PSA type refining unit, and a processing time of the purge step of the first bed is adjusted. Due to the adjustment of the processing time of the purge step of the first bed, the processing time of the adsorption step of the second (or third or fourth) bed may also be changed, thus affecting the methane gas content in the refined gas discharged from the second bed.

To solve this problem, the control unit 800 detects the composition of the refined gas through the detection sensor 920 and adjusts the operation time of each processing step of the refining unit, thus enabling to maintain the methane gas content in the refined gas over a certain level. For example, in the event that the methane gas content in the refined gas decreases, the control unit 800 may control the PSA type refining unit in such a way to increase the processing time of the adsorption step, thus facilitating the adsorption in the bed and thereby increasing the methane gas content in the refined gas.

As stated above, a pressure rise in the buffer tank 600 can be suppressed under the control of the control unit 800. As a result, a pressure difference between the inlet gas and the waste gas in each of the first and second refining units 100 and 200 can be maintained within a certain range, and the refining performance of the first and second refining units 100 and 200 can be maintained. Therefore, the product gas (second refined gas) can have a required level of purity.

As depicted in FIG. 2, a modification example of the first exemplary embodiment is different from the first exemplary embodiment in that a re-pressurizing unit and a pressure reducing valve are further provided. Thus, the same parts as those described in the first exemplary embodiment will be assigned same reference numerals, and redundant description thereof will be omitted, while focusing on distinctive parts.

A re-pressurizing unit 400' is configured to pressurize the first waste gas and supply the pressurized first waste gas into the third refining unit 300. The re-pressurizing unit 400' pressurizes the first waste gas to a preset pressure such that the first waste gas is refined well by a pressure difference in the third refining unit 300. For example, in case that the third refining unit 300 is of a membrane separation type, the third waste gas may be discharged from the third refining unit 300 at a pressure of about 1 bar.

At this time, since the pressure of the third refined gas is slightly lower than the pressure of the first waste gas passed through the re-pressurizing unit 400' and higher than the pressure (about 1 bar) of the second waste gas, a pressure reducing valve 910 may be provided on the second collection line 720 to allow the pressure of the third refined gas and the pressure of the second waste gas to be maintained at similar values.

The pressure reducing valve 910 is capable of maintaining the pressure of the third refined gas and the pressure of the second waste gas similar to each other by lowering the pressure of the third refined gas to about 1 bar or thereabout. Here, a let-down valve may be used as the pressure reducing valve 910.

Meanwhile, in case that the third refining unit 300 is of a PSA type using an adsorbent (e.g., Carbon Molecular Sieve) other than a zeolite-based one, the first waste gas is pressurized by the re-pressurizing unit 400', and the third gas is set to atmospheric pressure (e.g., about 1 bar). Here, if the third refining unit 300 is of the PSA type using a zeolite-based adsorbent, the re-pressurizing unit 400' may be omitted, and the third waste gas may be pumped to a vacuum pressure level by a vacuum pump (not shown).

As depicted in FIG. 3, another modification example of the first exemplary embodiment is distinguished from the first exemplary embodiment in that a re-pressurizing unit, a vacuum pump and a pressure reducing valve are further provided.

In this modification example, the re-pressurizing unit 400' pressurizes the first waste gas and supplies the pressurized first waste gas into the third refining unit 300, and the vacuum pump 500 pumps the third waste gas at a vacuum pressure level, thus allowing gas refinement in the third refining unit 300 to be performed well.

At this time, since the pressure of the third refined gas discharged from the third refining unit 300 is slightly lower than that of the first waste gas passed through the re-pressurizing unit 400', the pressure reducing valve 910 reduces the pressure of the third refined gas to a pressure level (about 1 bar) of the second waste gas, thus allowing the pressure of the third refined gas and the pressure of the second waste gas to be maintained at similar values.

Meanwhile, if detection values provided from the detection sensor 920 are databased and modeled, the data may have non-linear characteristics. It is very complicated to calculate result values for control based on the data having such non-linear characteristics, which may have adverse effect on a processing speed of the control unit 800. Occasionally, if the processing speed of the control unit 800 is slowed down, the processing speed of the control unit 800 may not keep up with a processing time changing speed necessary for the refining unit, or purity of the product gas may be deteriorated as a result of changing the processing time too late. A second exemplary embodiment to be described below is introduced to solve this problem.

In the following, a gas separation system in accordance with the second exemplary embodiment of the present disclosure will be discussed with reference to FIG. 4 to FIG. 6. The second exemplary embodiment is different from the first exemplary embodiment in that a linearization unit is further provided. Below, the same parts as those described in the first exemplary embodiment will be assigned same reference numerals, and redundant description thereof will be omitted, while focusing on distinctive parts.

Figure 4:
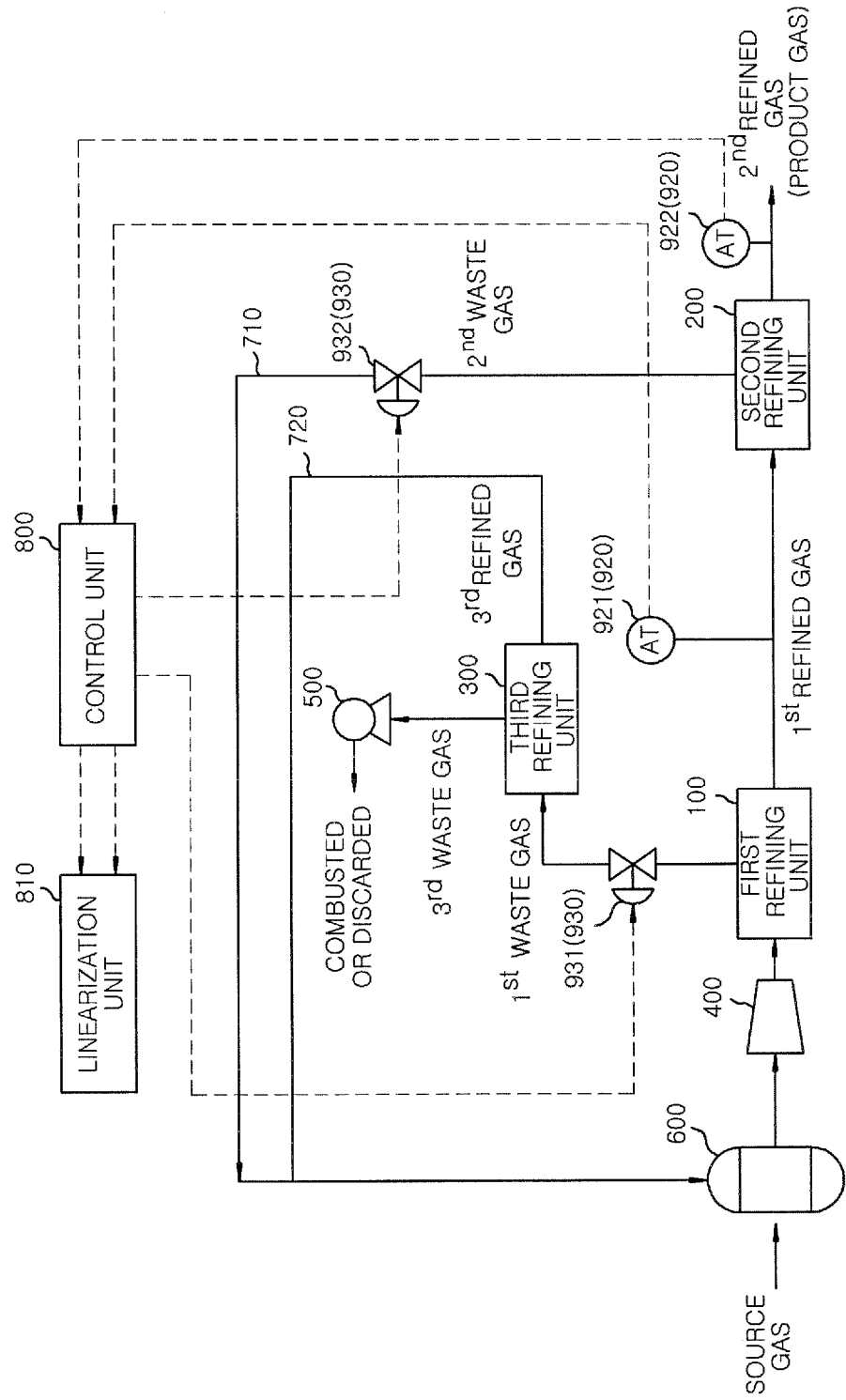
FIG. 4 is a block diagram illustrating a gas separation system in accordance with a second exemplary embodiment of the present disclosure.

FIG. 4 is a block diagram illustrating the gas separation system in accordance with the second exemplary embodiment. FIG. 5 is a block diagram illustrating a gas separation system in accordance with a modification example of the second exemplary embodiment, and FIG. 6 is a block diagram illustrating a gas separation system in accordance with another modification example of the second exemplary embodiment.

As depicted in FIG. 4, a linearization unit 810 is configured to receive detection values of the detection sensor 920 from the control unit 800 and linearize data having nonlinear characteristics. The linearized result is sent back to the control unit 800 from the linearization unit 810 and is used for the control of the flow rate control valve 930 through a preset model-based high-level control method. Accordingly, a processing speed of the control unit 800 can be improved, and the aforementioned problems can be prevented.

The linearization unit 810 may be implemented by a physically independent device from the control unit 800 and configured to transceive data to/from the control unit 800 through wired or wireless communications. Alternatively, the linearization unit 810 may be a program module provided within the same device as the control unit 800.

The linearization unit 810 is configured to receive data from the control unit 800 at a preset time interval and send the data back to the control unit 800 after linearizing them. At this time, the operation time interval of the linearization unit 810 may be set to be short in case the composition of a source gas varies continually, for the optimum operation condition changes as time elapses. On the other hand, in case that the composition of the source gas does not change greatly even with the lapse of time, the operation time interval of the linearization unit 810 may be set to be long. The control unit 800 may control the operation time interval of the linearization unit 810 based on information of the source gas provided from an additional source gas detection sensor (not shown), a management center, or the like.

As stated above, since the linearization unit 810 linearizes data having nonlinear characteristics and provides the control unit 800 with the linearized data at a regular time interval, it is possible to improve the processing speed of the control unit 800 while sufficiently reflecting the nonlinear characteristics of an actual process on the control unit 800. Thus, a control cycle can be shortened, and a more secure process control can be implemented.

Figure 5:
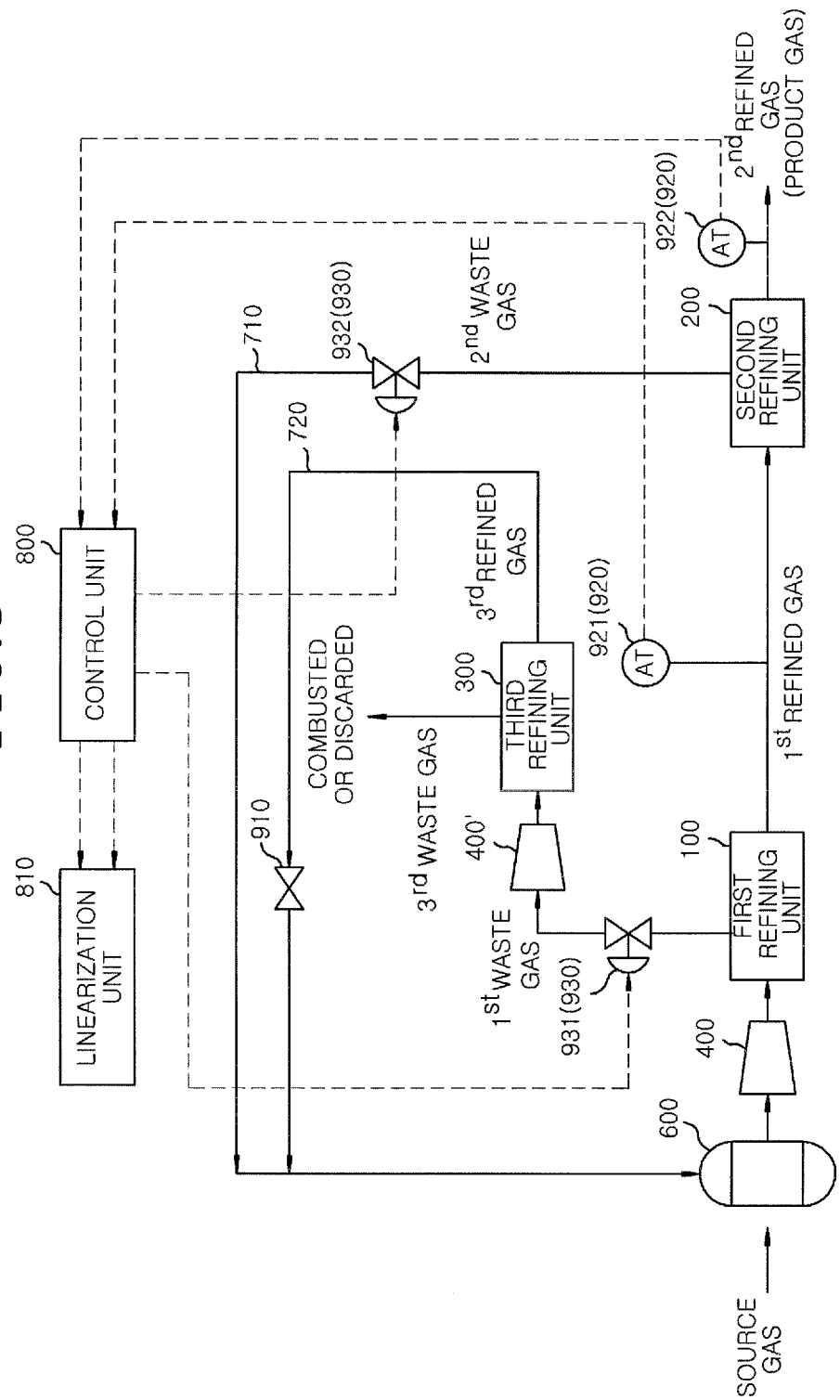
FIG. 5 is a block diagram illustrating a gas separation system in accordance with a modification example of the second exemplary embodiment.

FIG. 5 depicts a modification example of the second exemplary embodiment, and this modification example is distinguished from the second exemplary embodiment in that a re-pressurizing unit and a pressure reducing valve are further provided. FIG. 6 illustrates another modification example of the second exemplary embodiment, and this modification example is different from the second exemplary embodiment in that a re-pressurizing unit, a vacuum pump and a pressure reducing valve are further provided.

Since the re-pressurizing unit 400,' the vacuum pump 500 and the pressure reducing valve 910 in the modification examples of the second exemplary embodiment are substantially the same as the re-pressurizing unit 400,' the vacuum pump 500 and the pressure reducing valve 910 of the first exemplary embodiment, detailed description thereof will be omitted herein.

As stated above, the present disclosure is capable of improving a recovery rate of a methane gas, as compared to a conventional technique using a single refining unit. That is, by refining again the first waste gas from the first refining unit 100 through the third refining unit 300 and then introducing that gas back into the first refining unit 100, the methane gas can be further recovered.

Further, by refining again the first refined gas, which has been refined by the first refining unit 100, through the second refining unit 200, the methane gas purity of the product gas can be improved. Besides, since the second waste gas discharged from the second refining unit 200 is re-introduced into the first refining unit 100 after mixed with the third refined gas through the buffer tank 600, the recovery rate of the methane gas can be improved. As discussed above, since the first refined gas of the first refining unit 100 is refined again, the methane gas having high purity of about 97% can be provided to a consumer even if the methane content of the source gas is as low as about 60%, as in the above-described example.

Further, a higher recovery rate of the methane gas can be achieved from a source gas having the same composition as in the conventional case. Further, power consumption additionally required to achieve this effect is not great. Thus, in case of aiming at obtaining a certain level of purity and a certain level of recovery rate, power consumption per a methane gas production rate can be reduced.

Especially, even if a high-pressure waste gas is generated in the second refining unit 200, a pressure rise of the buffer tank 600 can be suppressed through the control of the flow rate control valve 930 by the control unit. Thus, refining performance of the first to third refining units 100 to 300 can be maintained over a certain level, so that a refined gas having the high methane content can be supplied.

In addition, since the data linearized by the linearization unit 810 is sent to the control unit 800 and utilized for the control of the flow rate control valve 930, the processing speed of the control unit 800 can be improved, as compared to the conventional case where result values for control are calculated based on data having nonlinear characteristics. As a result, deterioration of the purity of the product gas that might be caused by a slow-down of the processing speed of the control unit can be prevented.

Although exemplary embodiments of the present disclosure are described above with reference to the accompanying drawings, those skilled in the art will understand that the present disclosure may be implemented in various ways without changing the necessary features or the spirit of the present disclosure. Therefore, it should be understood that the exemplary embodiments described above are not limiting, but only an example in all respects. The scope of the present disclosure is expressed by claims below, not the detailed description, and it should be construed that all changes and modifications achieved from the meanings and scope of claims and equivalent concepts are included in the scope of the present disclosure.

What is claimed is:
1. A gas separation system, comprising:
a buffer tank that stores therein a source gas and supplies the source gas;
a pressurizing unit configured to receive the source gas from the buffer tank and pressurize the received source gas;
a first refining unit configured to produce a first refined gas by refining the source gas pressurized by the pressurizing unit, and discharge a first waste gas;
a second refining unit configured to produce a second refined gas by refining the first refined gas, and discharge a second waste gas;
a third refining unit configured to produce a third refined gas by refining the first waste gas;
a first collection line configured to guide the second waste gas to the buffer tank, and including a second flow rate control valve for controlling a flow rate of the second waste gas;
a second collection line configured to guide the third refined gas to the buffer tank; a first flow rate control valve for controlling a flow rate of the first waste gas; and
a control unit using a model-based high-level control mechanism, and configured to control the first flow rate control valve and the second flow rate control valve,
wherein the control unit is configured to control pressures of the second waste gas and the third refined gas inputted into the buffer tank by adjusting opening amounts of the first flow rate control valve and the second flow rate control valve such that purities of the first refined gas and the second refined gas are maintained,
wherein a PSA method is used in at least one of the first refining unit and the second refining unit, wherein the refining unit in which the PSA method is used comprises a bed configured to perform a multiple number of processing steps including an adsorption step repeatedly, and the control unit adjusts an operation time of each processing step performed by the bed.

2. The gas separation system of claim 1, further comprising:

a detection sensor configured to detect a state of at least one of the first refined gas and the second refined gas, wherein the control unit receives a detection result from the detection sensor and controls the first flow rate control valve and the second flow rate control valve based on the detection result.

3. The gas separation system of claim 2, further comprising:

a linearization unit configured to linearize, at a regular time interval, a nonlinear model according to a result value obtained from the detection sensor, and provide the linearized model to the control unit.

4. The gas separation system of claim 2, wherein the detection sensor comprises:

a first detection sensor provided on a first refined gas discharge line; and a second detection sensor provided on a second refined gas discharge line.

5. The gas separation system of claim 1, wherein the PSA method is not used in at least one of the first refining unit, the second refining unit and the third refining unit, and a membrane separation method is used in the at least one of the first refining unit, the second refining unit and the third refining unit in which the PSA method is not used.

6. The gas separation system of claim 1, further comprising:

a vacuum pump configured to pump a third waste gas which is discharged during the process of producing the third refined gas in the third refining unit.

7. The gas separation system of claim 1, further comprising:

a re-pressurizing unit configured to pressurize the first waste gas and supply the pressurized first waste gas to the third refining unit.

8. The gas separation system of claim 7, further comprising:

a pressure reducing valve provided on the second collection line, and configured to set a pressure of the third refined gas to be equal to a pressure of the second waste gas.

9. The gas separation system of claim 1, wherein the bed included in the refining unit using the PSA method is operated to repeat a pressurization step, an absorption step, a blow-down step and a purge step repeatedly, and wherein the control unit is configured to control a discharge pressure or a discharge flow rate of a waste gas discharged from the refining unit using the PSA method by adjusting an operation time of each of the processing steps performed by the bed.

10. The gas separation system of claim 1, wherein the third refining unit is further configured to discharge a third waste gas.

* * * * *